United States Patent [19]

Yamazaki et al.

[11] 4,304,994
[45] Dec. 8, 1981

[54] METHOD OF AND APPARATUS FOR MONITORING RADIOACTIVITY CONCENTRATION OF GAS

[75] Inventors: Kanji Yamazaki, Tokyo; Hiroji Mikawa, Tokaimura; Masao Kitamura, Hitachiota, all of Japan

[73] Assignees: Hitachi, Ltd.; The Tokyo Electric Power Co., Inc., both of Tokyo, Japan

[21] Appl. No.: 173,844

[22] Filed: Jul. 30, 1980

[30] Foreign Application Priority Data

Aug. 1, 1979 [JP] Japan .................................. 54/97197

[51] Int. Cl.³ ...................... G01N 31/00; G01N 33/00
[52] U.S. Cl. ...................................... 250/304; 250/428
[58] Field of Search ............... 250/303, 304, 328, 364, 250/428; 176/19 R

[56] References Cited

U.S. PATENT DOCUMENTS

| | | |
|---|---|---|
| 3,590,247 | 6/1971 | Holford ............................ 250/304 |
| 3,838,554 | 10/1974 | Wilhelm et al. . |
| 3,864,574 | 2/1975 | Wilhelm ............................. 250/364 |
| 3,982,129 | 9/1976 | Lattin et al. ........................ 250/304 |
| 4,071,761 | 1/1978 | Horrocks ............................ 250/328 |
| 4,107,533 | 8/1978 | Tabuchi et al. ..................... 250/364 |

OTHER PUBLICATIONS

"Continuous Monitoring of Radioactive Iodine Emissions", Wilhelm et al., 13th AEC Air Cleaning Conference, 1974.

*Primary Examiner*—Bruce C. Anderson
*Attorney, Agent, or Firm*—Craig and Antonelli

[57] ABSTRACT

A radioactivity monitoring system capable of exactly detecting the concentration of $^{131}I$ in a gas even in a low concentration is disclosed in which a sample gas is passed through a filter cartridge filled with an iodine absorbing material to accumulate iodine, radiation is counted on both entrance and exit sides of the filter cartridge, the absorption distribution of iodine absorbed in the filter cartridge is estimated from the ratio between respective counts obtained on the entrance and exit sides, and one of the counts is corrected by the estimated absorption distribution of iodine to calculate the radioactivity concentration of $^{131}I$ in the gas.

6 Claims, 8 Drawing Figures

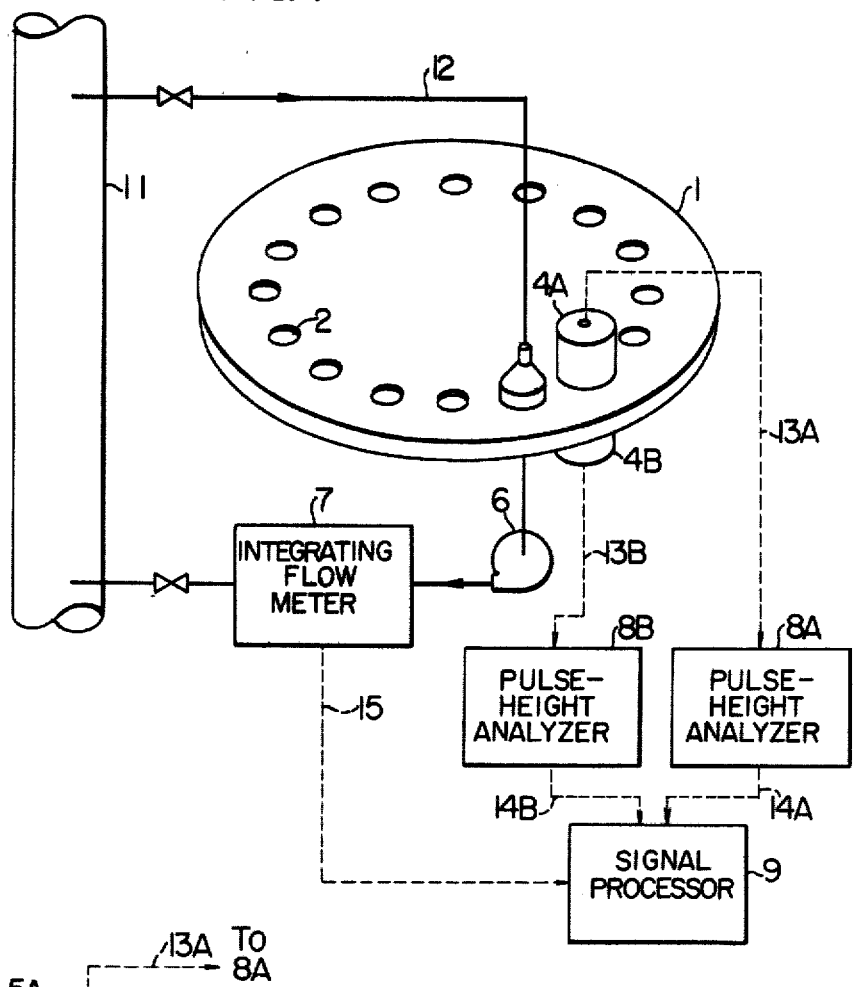
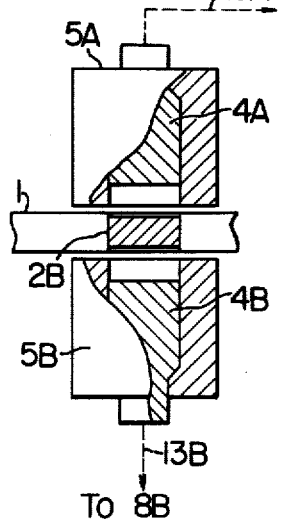
FIG. 1
FIG. 2

METHOD OF AND APPARATUS FOR MONITORING RADIOACTIVITY CONCENTRATION OF GAS

BACKGROUND OF THE INVENTION

The present invention relates to a method of and an apparatus for continuously monitoring the concentration of a specified radioactive element in a gas, and more particularly to a method of and an apparatus for monitoring the radioactivity concentration of a gas wherein a radioactive element in the gas is accumulated on an absorption material and then the radioactivity of the accumulated element is measured, so that even an extremely low radioactivity concentration can be detected.

An article entitled "Continuous Monitoring of Radioactive Iodine Emission" by J. G. Wilhelm and H. Mahnau, which was presented at the 13th AEC Air Cleaning Conference, 1974, discloses a monitoring apparatus in which a sample gas is introduced into a filter cartridge filled with an iodine absorption material, to accumulate $^{131}I$ in the sample gas on the absorption material, $\gamma$-rays emitted from the accumulated $^{131}I$ are detected by a scintillation counter disposed adjacently to the filter cartridge, and both the frequency of detecting $\gamma$-rays and the volume of the sample gas passing through the filter cartridge are monitored to know the radioactivity concentration of $^{131}I$ in the sample gas.

In such an apparatus, it is an important problem how many portions of $^{131}I$ isotopes can be collected by the absorption material when the sample gas passes through the filter cartridge. The absorbing power of the iodine absorption material depends upon such factors as temperature, humidity and velocity of the gas passing through the filter cartridge. Accordingly, the ratio of the amount of iodine collected by the filter cartridge to the amount of iodine in the gas passing through the filter cartridge varies with the above-mentioned factors. Therefore, the radioactivity concentration of a gas which is calculated on the basis of the radioactivity of accumulated iodine, contains unavoidable errors.

SUMMARY OF THE INVENTION

An object of the present invention is to provide a method of and an apparatus for monitoring the radioactivity concentration of a gas which can exactly monitor the radioactivity concentration, even when the collection efficiency of a filter cartridge for a radioactive element is varied.

Another object of the present invention is to provide a method of and an apparatus for monitoring the radioactivity concentration of a gas wherein an accurate value of the radioactivity concentration is obtained without being corrected by measured values of the temperature, the humidity and the like of the gas.

A further object of the present invention is to provide a method and an apparatus suitable for the monitoring of the radioactivity concentration of residual $^{131}I$ in a gas.

The above and other objects of the present invention can be attained by a monitoring method according to the present invention which comprises the steps of passing a sample gas in a direction through a filter cartridge filled with an absorption material for a specified radioactive element to accumulate the radioactive element in the filter cartridge, counting radiation on both entrance and exit sides of the filter cartridge, estimating the absorption distribution of the radioactive element absorbed in the filter cartridge on the basis of the ratio between a pair of counts obtained on both sides of the filter cartridge, and correcting one of the counts by the estimated absorption destribution of absorbed radioactive element to obtain the radioactivity concentration of the gas.

According to the present invention, the estimation of the absorption distribution of the radioactive element absorbed in the filter cartridge and the correction of the count on the basis of the above estimation are carried out in the following manner.

When the sample gas has passed through the filter cartridge in one direction, if the absorption coefficient of the absorption material is kept constant, the absorption distribution of the absorbed radioactive element in the above-mentioned direction is given by the following equation:

$$A(x_i) = e^{-\mu x_i} - e^{-\mu(x_i + \Delta x)} \tag{1}$$

where A is the amount of the absorbed radioactive element (in relative value), $\mu$ an absorption coefficient, $x_i$ a depth of the absorption material (the depth from the entrance to the i-th part of the absorption material when the absorption material is divided into n parts in the direction from the entrance thereof to the exit), $\Delta x_a$ small thickness of the absorption material in the above direction.

Further, the probability $\eta_\gamma(x_i)$ of radiation which is emitted from the radiation source distributed at a depth $x_i$ of the absorption material and passes through the radiation detector disposed on the entrance side and the probability $\eta_\gamma(x_{n-i})$ of the above radiation which passes through the radiation detector disposed on the exist side depend upon the respective shapes of each radiation detector and the absorption material, and the distance between each radiation detector and the absorption material.

By combining the distribution $A(x_i)$ given by equation (1) with the above-mentioned probability, the efficiency $K_1$ at the radiation detector on the entrance side and the efficiency $K_2$ at the radiation detector on the exit side are given by the following equations:

$$K_1 = \sum_{i=0}^{n-1} \{(e^{-\mu x_i} - e^{-\mu(x_i + \Delta x)}) \cdot \eta_\gamma(x_i)\} \tag{2}$$

$$K_2 = \sum_{i=0}^{n-1} \{(e^{-\mu x_i} - e^{-\mu(x_i + \Delta x)}) \cdot \eta_\gamma(x_{n-i})\} \tag{3}$$

According to the present invention, $K_1$, $K_2$ and $K_1/K_2$ are previously calculated for various values of $\mu$. When the monitoring of radioactivity of a gas is actually carried out, a value of absorption coefficient $\mu$ at the time when a sample gas passes through the filter cartridge is estimated from the ratio $N_1/N_2$ of a count $N_1$ obtained by the detector on the entrance side to a count $N_2$ obtained by the detector on the exit, since the ratio $N_1/N_2$ is equal to the above-mentioned ratio $K_1/K_2$. That is, the absorption distribution of radioactive element in the filter cartridge is estimated. Then, the efficiency $K_1$ at the detector on the entrance side is calculated on the basis of the estimated absorption distribution. The efficiency $K_1$ thus obtained is used to calculate the radioactivity concentration of the sample gas which is given by the following equation:

$$C_o = \frac{N_1/(K_1 \times \gamma_k)}{3.7 \times 10^4} \cdot \frac{1}{T_1} \cdot \frac{1}{V}$$

where $C_o$ is the radioactivity concentration of the sample gas ($\mu$Ci/cm$^3$), $\gamma_k$ the counting efficiency of the radiation detector depending upon the radiation energy, $T_1$ the counting time (sec), V the volume of the sample gas passing through the filter cartridge (cm$^3$), and $N_1$ the count obtained by the radiation detector on the entrance side of the filter cartridge.

BRIEF DESCRIPTION OF THE DRAWINGS

FIg. 1 is a block diagram showing the whole construction of an embodiment of a monitoring apparatus according to the resent invention.

FIG. 2 is a side, partially sectional view showing in detail a part of the embodiment shown in FIG. 1.

DESCRIPTION OF THE PREFERRED EMBODIMENTS

Figure 3:
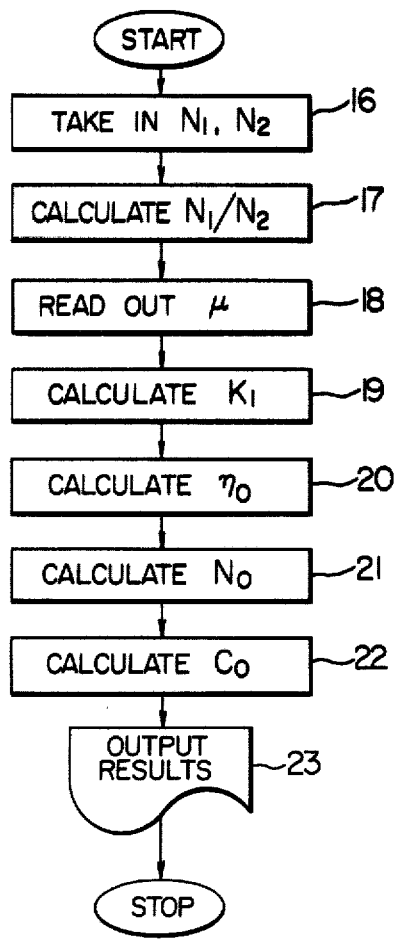
FIG. 3 is a flow chart for explaining the processing in block 9 shown in FIG. 1.

FIG. 1 shows an embodiment of a monitoring apparatus according to the present invention which is suitable for the monitoring of radioactive iodine in nuclear power stations.

Referring now to FIG. 1, a large number of filter cartridges 2 for accumulating iodine are arranged in a turnable 1. A sample gas starting from an exhaust duct 11 of a reactor building is led through a sampling pipe 12 to a first one of the filter cartridges 2, passes through the filter cartridge, and then goes back to the exhaust duct 11 through an air pump 6 and an integrating flow meter 7. After a predetermined amount of gas has flowed from the duct 11 to the duct 11 through the above-mentioned flow path, the turntable 1 is rotated to place the filter cartridge, through which the predetermined amount of gas has passed, between a pair of radiation detectors 4A and 4B. FIG. 2 is an enlarged view of the detectors 4A and 4B. The γ-rays emitted from $^{131}$I accumulated in the filter cartridge are counted by both of the upper and lower radiation detectors 4A and 4B. Each of these radiation detectors is the so-called scintillation counter, which is made up of a cylindrical crystal of NaI(Tl) and a photomultiplier. In FIG. 2, reference numerals 5A and 5B designate radiation ray shields. The sample gas is passed through a second one of the filter cartridges in a period when the counting of radiation is conducted. When the predetermined amount gas has passed through the second filter cartridge, the turntable 1 is again rotated to count the radiation emitted from the second filter cartridge.

Signals from the radiation detectors 4A and 4B are sent to pulse-height analyzers 8A and 8B through lines 13A and 13B, respectively. In each of the pulseheight analyzers 8A and 8b, the amount of γ-rays emitted from $^{131}$I is measured through pulse-height analysis. The results of analysis are sent through lines 14A and 14B to a signal processor 9, in which, in accordance with the process shown in FIG. 3, the overall efficiency of the monitoring apparatus is determined, and the radioactivity and the radioactivity concentration of the sample gas are calculated.

The iodine absorption material, with which the filter cartridge 2 is filled, has a porous carrier which carries therein silver particles or silver compounds. Examples of the iodine absorption material are disclosed in, for example, U.S. Pat. No. 3,838,554. The iodine absorption material of this kind can efficiently absorb iodine which is borne by air in the form of $CH_3I$-molecule or $I_2$-molecule. In this embodiment, the iodine absorption material in the filter cartridge has a diameter of 76 mm and a height of 16 mm. Incidentally, each of the radiation detectors 4A and 4B includes an NaI(Tl) crystal having a diameter of 76.2 mm and a height of 76.2 mm.

FIG. 3 is a flow chart for showing the processing performed in the signal processor 9. In a step 16, a count $N_1$ with respect to radiation on the entrance side of the filter cartridge and a count $N_2$ on the exit side are measured. This is carried out by taking in, through the lines 14A and 14B, the results of analysis from the pulse-height analyzers 8A and 8B. In a step 17, the ratio $N_1/N_2$ is calculated. In a step 18, a value of absorption coefficient $\mu$ which corresponds to the calculated value of $N_1/N_2$, is read out of a data table which has been stored in the processor 9.

The correspondence between the value of the ratio $N_1/N_2$ and the value of the absorption coefficient $\mu$ has been previously calculated and determined on the basis of the following principle.

As is well known, the absorption coefficient $\mu$ is defined as the reciprocal of a distance (in an absorption material) necessary for the amount of an element (namely, iodine in this embodiment) in a gas to be reduced to 1/e of an original amount when the gas passes through the absorption material. Accordingly, in this embodiment, the distribution of iodine absorbed by the absorption material in the filter cartridge 2 is expressed by the previously-mentioned equation (1), that is, $$A(x_i) = e^{-\mu i} - e^{-\mu(x_i + \Delta x)}$$

Figure 4A:
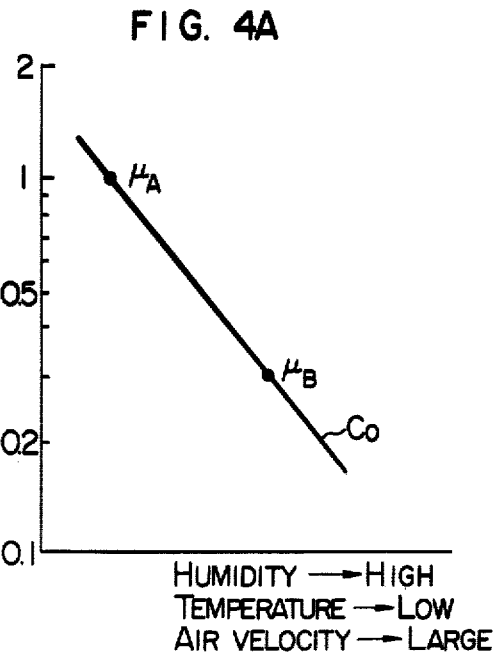
FIGS. 4A and 4B are graphs for explaining the absorption coefficient $\mu$.
Figure 4B:
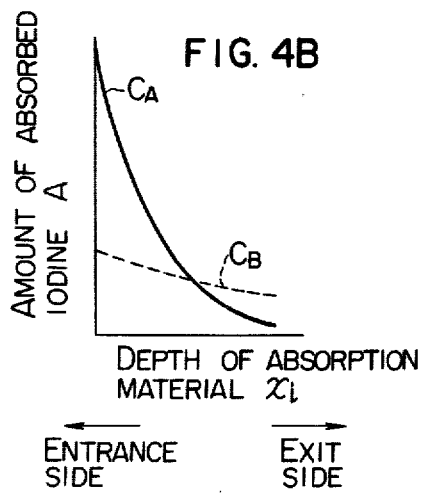

The absorption coefficient $\mu$, as is shown in FIG. 4A, depends upon the humidity, the temperature and the velocity of the gas passing through the absorption material. Two absorption coefficients $\mu_A$ and $\mu_B$ shown in FIG. 4A correspond to the distribution $C_A$ and $C_B$ of absorbed iodine shown in FIG. 4B, respectively. As is shown in FIG. 4B, the distribution of absorbed iodine is greater in inclination as the absorption coefficient $\mu$ is larger.

While, the probability $\eta_\gamma$ of the radiation which is emitted from the radiation source distributed on a thin disc and passes through a cylindrical radiation detector is given by a triple integral. The probability $\eta_\gamma$ with respect to the radiation detector used in this embodiment was calculated for various distances between the radiation sources and the detector. The results of calculation are shown in FIG. 5.

Figure 5:
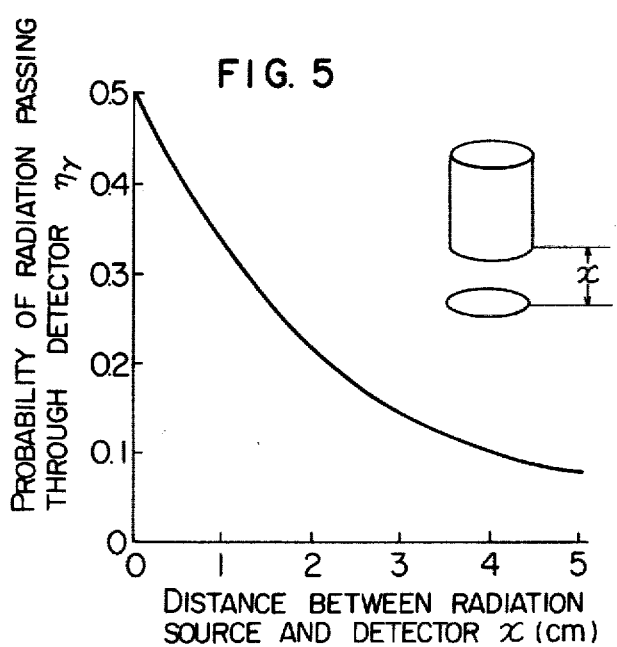
FIG. 5 is a graph for explaining the probability of radiation passing through a radiation detector.

The probability $\eta_\gamma(x_i)$ of the radiation which is emitted from the radiation source distributed at a depth $x_i$(cm) of the absorption material from the entrance side thereof and passes through the radiation detector 4A and the probability $\eta\gamma(x_{n-i})$ of the same radiation which passes through the radiation detector 4B are obtained from the graph shown in FIG. 5. The efficiencies $K_1$ and $K_2$ given by combining the absorption distribution of the absorbed iodine with the probability of the radiation passing through the detector are expressed by the previously-mentioned equations (2) and (3), that is, $$K_1 = \sum_{i=0}^{n-1} \{(e^{-\mu x_i} - e^{-\mu(x_i+\Delta x)}) \cdot \eta_\gamma(x_i)\}$$

$$K_2 = \sum_{i=0}^{n-1} \{(e^{-\mu x_i} - e^{-\mu(x_i+\Delta x)}) \cdot \eta_\gamma(x_{n-i})\}$$

where $K_1$ is the efficiency at the radiation detector 4A, and $K_2$ that at the radiation detector 4B.

The ratio $K_1/K_2$ is equal to the ratio $(N_1/N_2)$ of the count $N_1$ obtained on the side of the detector 4A to the count $N_2$ on the side of the detector 4B.

By calculating the efficiency $K_1$ and $K_2$ on the basis of equations (2) and (3) for various values of $\mu$, the values of $K_1/K_2$ or $N_1/N_2$ corresponding to these values of $\mu$ are obtained.

Figure 6:
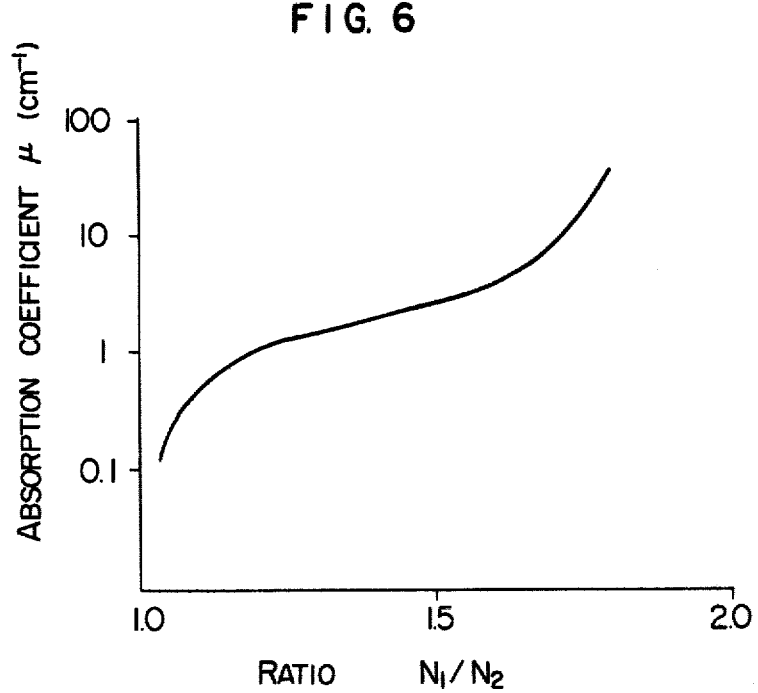
FIG. 6 is a graph for showing a relation between the absorption coefficient $\mu$ and the ratio $N_1/N_2$ in the embodiment shown in FIGS. 1 to 3.

FIG. 6 is a graph showing the relation between $\mu$ and $N_1/N_2$, which is obtained for the radiation detectors 4A and 4B and the filter cartridge 2 used in the embodiment.

Turning now back to FIG. 3, the processing performed in the signal processor 9 is again explained. In the step 18, the value of absorption coefficient $\mu$ corresponding to the value of $N_1/N_2$ calculated in the step 17 is obtained from the above-mentioned relation between $\mu$ and $N_1/N_2$. That is, the absorption distribution of absorbed iodine in the filter cartridge 2 is estimated from the ratio between the counts obtained on both sides. In a step the 19, the efficiency $K_1$ at the radiation detector 4A is calculated using the estimated distribution of absorbed iodine. In more detail, the value of $\mu$ obtained in the step 18 is substituted for $\mu$'s in the equation (2) to calculate the efficiency $K_1$. In a step 20, using the efficiency $K_1$ and the counting efficiency $\gamma_k$ of the radiation detector depending upon radiation energy, the overall detection efficiency $\eta_o$ is calculated which is given by the following equation:

$$\eta_o = K_1 \cdot \gamma_k \qquad (4)$$

In a step 21, the radioactivity of the sample gas having passed through the filter cartridge is calculated on the basis of the following equation, using the overall detection efficiency $\eta_o$ and the count $N_1$:

$$N_o = \frac{N_1/\eta_o}{3.7 \times 10^4} \times \frac{1}{T_1} \qquad (5)$$

where $N_o$ is the radioactivity of sample gas ($\mu$Ci), and $T_1$ the counting time (sec).

In a step 22, the signal from the integrating flow meter 7 is sent through the signal line 15 to the processor 9, and the radioactivity concentration of the sample gas is calculated which is given by the following equation:

$$C_o = N_o/V \qquad (6)$$

where $C_o$ is the radioactivity concentration of sample gas ($\mu$Ci/cm³), and V the volume of sample gas having passed through the filter cartridge.

In a step 23, the results obtained are outputted. Thus, the processing shown in FIG. 3 is completed.

As explained above, according to this embodiment, the distribution of iodine absorbed in the filter cartridge is estimated from the ratio between the counts obtained on both the entrance and exit sides of the filter cartridge, and the detection efficiency of the radiation detector is obtained on the basis of the estimated absorption distribution and used to calculate the radioactivity concentration of $^{131}$I in the gas. Accordingly, an accurate value for the radioactivity concentration is obtained independently of a change in the absorption coefficient, and therefore this embodiment is suitable for the monitoring of exhaust of $^{131}$I into air which is required to detect $^{131}$I in an extremely low atmospheric concentration. However, the present invention is not restricted to the monitoring of $^{131}$I, but is applicable to various cases where a radioactive element in a gas is accumulated on an absorption material to detect the radioactivity concentration of the gas.

Figure 7:
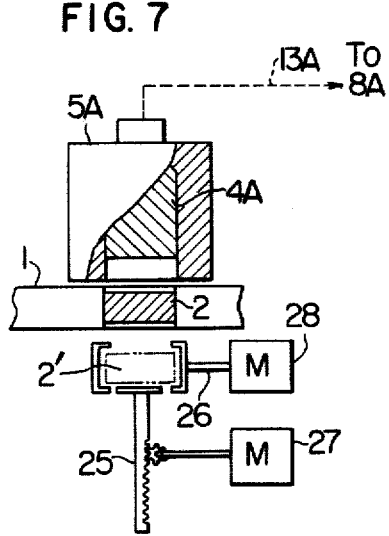
FIG. 7 is a side, partially sectional view showing another embodiment of the present invention.

In the embodiment shown in FIGS. 1 to 3, a pair of radiation detectors are employed. However, a monitoring apparatus according to the present invention can include only a single radiation detector. FIG. 7 is a sectional view showing an embodiment of such a monitoring apparatus. The embodiment shown in FIG. 7 differs from that shown in FIG. 2 in that the lower radiation detector 4B is eliminated and a mechanism for turning the filter catridge upside down is added in place of the detector 4B. In other words, after a predetermined amount of gas has passed through a filter cartridge 2, the filter cartridge is moved to the under side of the radiation detector 4A and the radiation is counted for a predetermined period. The filter cartridge 2 is then taken out by a mechanism 25 for rising and falling the filter cartridge. The taken-out filter cartridge 2' is then turned over by another mechanism 26 for turning the filter cartridge upside down, and brought back to the original position, beneath the radiation detector 4A to count the radiation again for a predetermined period. Incidentally, reference numerals 27 and 28 designate motors for rising and falling the filter cartridge and for turning the filter cartridge upside down, respectively. When the time of the first counting, the time of the second counting, the time necessary for turning over the filter cartridge, the count obtained in the first counting, and the count obtained in the second counting are given by $T_1$, $T_2$, $T_3$, $N_1$, and $N_2'$, respectively, the count $N_2'$ in the second counting is corrected taking the decay of radioactivity into consideration, as is given by the following equation:

$$N_{2A} = N_2'/e^{-0.693(T_1+T_3)/T_{\frac{1}{2}}} \qquad (7)$$

where $N_{2A}$ is the corrected value of the count in the second counting, and $T_{\frac{1}{2}}$ the half-life of the radioactive element.

The absorption coefficient $\mu$ is estimated from the ratio of $N_1/T_1$ to $N_{2A}/T_2$, and then the same processing as shown in FIG. 3 is performed. That is, the radioactivity concentration of gas can be exactly monitored in the same manner as the embodiment shown in FIGS. 1 to 3.

We claim:

1. A method of monitoring radioactivity concentration of a gas comprising the steps of:
   passing a predetermined amount of a sample gas through a filter cartridge in a direction from its entrance side to its exit side, said filter cartridge being filled with an absorption material which is capable of absorbing a specified radioactive element;

counting radiation both on said entrance side and on said exit side of said filter cartridge to obtain the respective counts from said two sides;

estimating absorption distribution of said radioactive element absorbed in said filter cartridge from the ratio between said respective counts;

calculating an efficiency on the basis of the combination of said estimated absorption distribution with a probability that the radiation emitted from said radioactive element with said absorption distribution passes through a radiation detector on said entrance side of said filter cartridge; and correcting the count obtained by said radiation detector, by using said efficiency to obtain the radioactivity concentration of said sample gas.

2. A method of monitoring the radioactivity concentration of a gas according to claim 1, wherein said step of counting radiation comprises a step of setting said filter cartridge between said radiation detector and another radiation detector disposed at said exit side to count radiation by said respective radiation detectors.

3. A method of monitoring the radioactivity concentration of a gas according to claim 1, wherein said step of counting radiation comprises a first step of counting radiation on said entrance side of said filter cartridge by said radiation detector, a second step of turning over said filter cartridge, and a third step of counting radiation emitted from said turned filter cartridge by said radiation detector.

4. A method of monitoring the radioactivity concentration of a gas according to claim 1, wherein said step of estimating said absorption distribution comprises a first step of previously storing the correspondence between various values of absorption coefficient of said absorption material in said filter cartridge and various values of said ratio between said respective counts, and a second step of reading out a value of absorption coefficient corresponding to an actual value of said ratio.

5. A method of monitoring the radioactivity concentration of a gas according to claim 4, wherein in said first step said values of said ratio between said respective counts are given by the ratio between $K_1$ and $K_2$ calculated on the basis of the following equations:

$$K_1 = \sum_{i=0}^{n-1} \{(e^{-\mu x_i} - e^{-\mu(x_i + \Delta x)}) \cdot \eta_\gamma(x_i)\}$$

$$K_2 = \sum_{i=0}^{n-1} \{(e^{-\mu x_i} - e^{-\mu(x_i + \Delta x)}) \cdot \eta_\gamma(x_{n-i})\}$$

where $\eta_\gamma(x_i)$ is the probability of radiation which is emitted from radiation sources distributed at a depth $x_i$ of said absorption material in said filter cartridge and passes through said radiation detector disposed on said entrance side of said filter cartridge, $\eta_{65}(x_{n-i})$ the probability of radiation emitted from said radiation sources and passes through another radiation detector disposed on said exit side of said filter cartridge, and $\mu$ an absorption coefficient.

6. An apparatus for monitoring the radioactivity concentration of a gas comprising:

a first and a second radiation detector arranged opposite to each other;

a filter cartridge filled with an absorption material which is capable of absorbing a specified radioactive element;

means for passing a predetermined amount of a sample gas through said filter cartridge in a direction;

means for moving said filter cartridge after said predetermined amount of sample gas passed through said filter cartridge to place said filter cartridge between said first and second radiation detectors; and signal processing means supplied with the respective counts obtained by counting radiation by said first and second radiation detectors, for estimating absorption distribution of said radioactive element absorbed in said filter cartridge from the ratio between said respective counts and for correcting the count obtained by said first radiation detector by using an efficiency corresponding to said absorption distribution so as to obtain the radioactivity concentration of said sample gas.

* * * * *